United States Patent [19]

Ade et al.

[11] 4,105,906
[45] Aug. 8, 1978

[54] ARMATURE FOR A MOTOR IN A PUMP FOR LIQUIDS

[75] Inventors: Rolf Ade; Karl-Friedrich Schubert, both of Bietigheim-Bissingen; Manfred Staller, Hessigheim, all of Germany

[73] Assignee: ITT Industries, Inc., New York, N.Y.

[21] Appl. No.: 743,767

[22] Filed: Nov. 22, 1976

[30] Foreign Application Priority Data

Dec. 10, 1975 [DE] Fed. Rep. of Germany ....... 2555529

[51] Int. Cl.$^2$ ............................................. H02K 5/12
[52] U.S. Cl. ..................................... 310/87; 310/214; 310/270
[58] Field of Search ................... 310/66, 87, 214, 194, 310/42, 43, 261, 264, 265, 270, 217, 263, 58, 60, 85, 62, 45, 63, 40 MM, 88, 179, 195, 273

[56] References Cited

U.S. PATENT DOCUMENTS

| | | | |
|---|---|---|---|
| 990,180 | 4/1911 | Young | 310/214 |
| 1,320,126 | 10/1919 | Dudley | 310/214 |
| 2,015,554 | 9/1935 | Fisher | 310/214 |
| 2,232,773 | 2/1941 | Daiger | 310/214 |
| 2,298,862 | 10/1942 | Balz | 310/265 |
| 2,316,635 | 4/1943 | Staak | 310/214 |
| 2,340,905 | 2/1944 | Sigmund | 310/87 |
| 3,634,709 | 1/1972 | Lehenaff | 310/214 |
| 3,754,844 | 8/1973 | Nusser | 310/43 |
| 3,870,910 | 3/1975 | Fussner | 310/43 |
| 3,996,486 | 12/1976 | Madsen | 310/265 |

*Primary Examiner*—R. Skudy
*Attorney, Agent, or Firm*—James B. Raden; William J. Michals

[57] ABSTRACT

An armature for a pump motor, in which losses due to vorticity are substantially reduced, is disclosed. The armature includes a pair of symmetrical housing covers provided with axially extending webs. The webs overlap in nesting relationship and are provided with interlocking elements. Accordingly, the overall housing is streamlined without abrupt discontinuities which would otherwise contribute vorticity losses.

4 Claims, 7 Drawing Figures

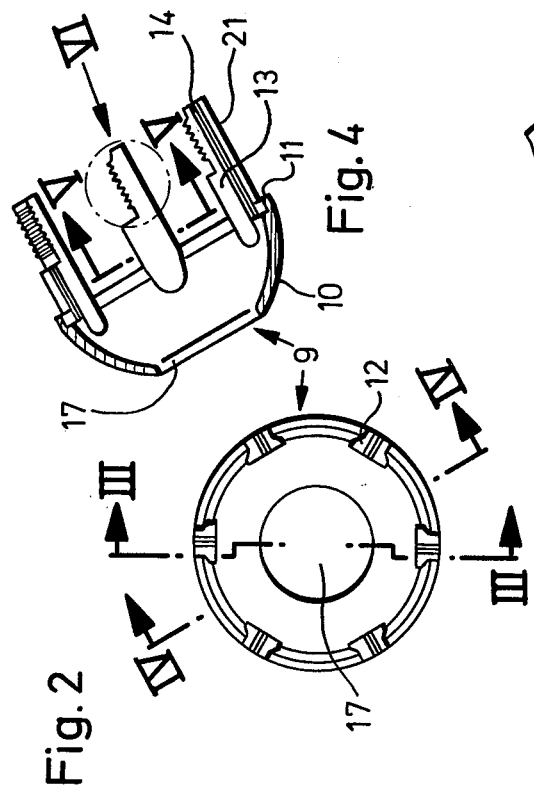
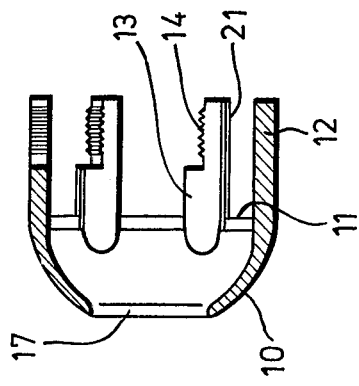
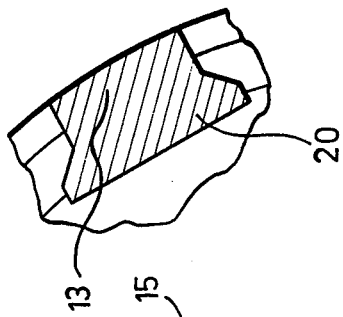
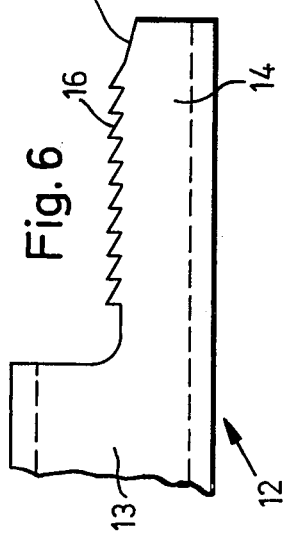

ARMATURE FOR A MOTOR IN A PUMP FOR LIQUIDS

BACKGROUND OF THE INVENTION

This invention relates to an armature for a motor in a pump for liquids, the motor of which is flown through by the liquid to be supplied, comprising a cover on the coil ends for reducing loss in efficiency by vorticity.

Such pumps are particularly suitable for use in the supply of fuel-oil in central oil supply systems and for the supply of fuel in automotive vehicles. They are primarily located in the stream of liquid conducting therethrough. The pump consists of the motor housing which also function as the pump casing. Accordingly, the housing receives a pump impeller and an armature wherein the pump impeller is flanged to the armature and wherein the liquid flows therethrough. In order to reduce drive power requirements attempts have been made to reduce the flow losses. This is especially important for fuel supply pumps in automotive vehicles, as the available electrical energy is limited. The coil ends of the armature of a known pump are therefore covered by caps held by sealing rings. Thereby the vorticity on the coil ends is diminished. However, considerable flow losses at the armature plates still arise.

It is an object of the invention to further reduce the losses on such a pump, so that the drive power of the motor is diminished and the delivery of the pump remains the same.

SUMMARY OF THE INVENTION

This is achieved according to the invention in that the covers are formed symmetrically and provided with axially running webs extending from the rim of the cover and in that the webs have the width of the grooves between the armature plates and form a common, at least approximately smooth peripheral area with said armature plates. The webs are overlapping and provided with locking elements. The locking elements are preferably provided in the overlapping region on the webs. Accordingly, the complete armature unit has a smooth surface. The reasons for vorticity are eliminated to a large extent, so that the losses in efficiency are only small. Furthermore the caps readily can be mounted and are non-interchangeable.

In order to avoid that the webs are pressed out of the grooves in radial direction by a distortion of the plastic material in further development of the invention the webs are having a T-shaped cross-section, whereby the crossbar is located radially inside and supports on the armature plates. That means that in the overlapping region the webs are L-shaped and in the other region T-shaped. By this profiling it is achieved that the webs are wider than the groove below the groove and therefore cannot be pressed out.

In further development of the invention and in order to achieve the largest possible degree of efficiency the rim of the cap as well as the webs are lying against the armature plates as a sealing. For this purpose the webs are preferably provided with a saw toothing in the overlapping region. Thereby also vorticities being caused by radially leaking out fluid are avoided. The delivery stream fully runs through the armature through bores in the caps, said caps leaving a large enough gap between the commutator or shaft.

Tests with a fuel pump in an automotive vehicle showed that at the time being a standard pump with a simple cap has a pressure of 0.3 bar, whereas the same pump equipped according to the invention has a pressure of 0.35 bar.

BRIEF DESCRIPTION OF THE DRAWING

A preferred embodiment of the invention will now be described in detail in conjunction with the accompanying drawing, in which:

FIG. 2 is a view on a cap seen from the webs;

FIG. 3 is a section taken along the line III—III of FIG. 2;

FIG. 4 is a section taken along the line IV—IV of FIG. 2;

FIG. 5 is a sectional taken along the line V—V of FIG. 4;

FIG. 6 is an enlarged view of the detail VI in FIG. 4; and,

DETAILED DESCRIPTION

Figure 1:
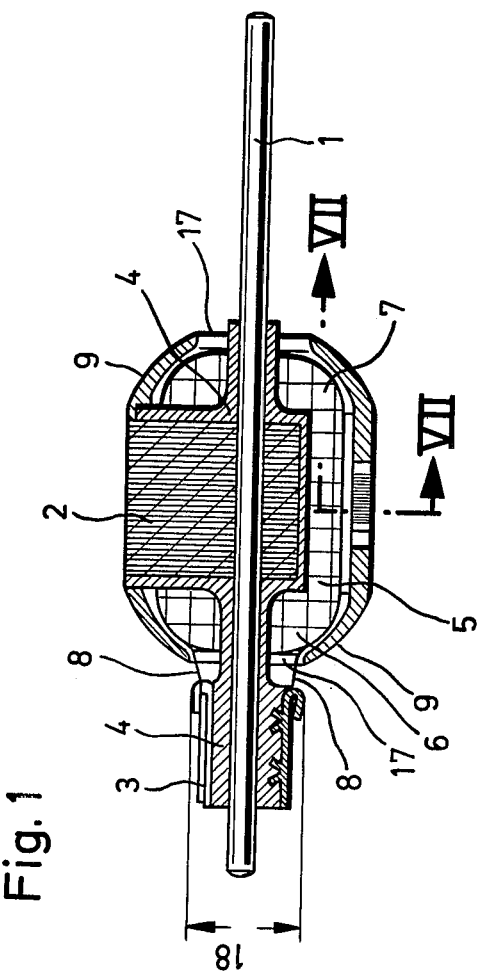
FIG. 1 is a longitudinal section through an armature comprising caps.
Figure 7:
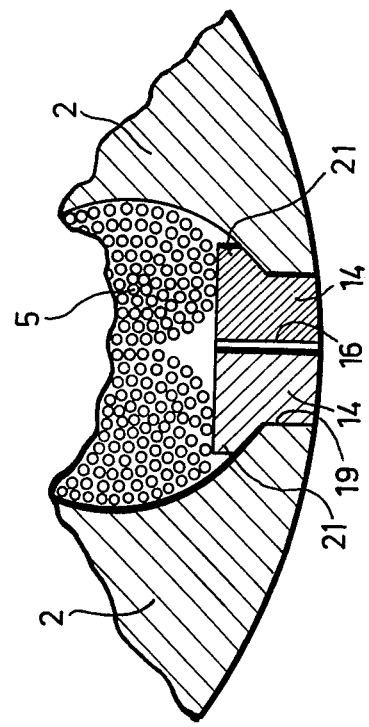
FIG. 7 is a section taken along the line VII—VII of FIG. 1.

On an armature shaft 1 the armature plates 2 and the commutator segments 3 are held by a molded plastic 4. The winding 5 is provided between the armature plates 2, thereby forming the coil ends 6 and 7. Said winding is connected to the commutator segments 3 through its end portions 8.

The coil ends 6 and 7 are covered with symmetrical covers 9. Said covers consist of an approximately ball-shaped cap 10 from the rim of which axially extending webs 12 are originating. The webs 12 are having a T-shaped (FIG. 5) cross-section in the first region and in an overlapping region 14 and L-shaped cross-section. Thus, the longitudinal cross-section of each web 12 is generally T-shaped whereas the longitudinal profile is L-shaped. This configuration provides a double locking feature as hereinafter described. The overlapping region 14 is provided with an inclined portion 15 and with a toothing 16. Thereby the teeth of the toothing 16 are aligned towards the region 13.

When the covers 9 are mounted, the bore 17 is at least as large as the outer diameter of the commutator 3, they are pushed over the coil ends 6 and 7. Thereby the webs 12 on both sides are inserted into the grooves 19 existing between the individual armature plates 2. Once inserted, the respective teeth of toothing 16 of each cover 9 are aligned or extend in opposite directions relative to the teeth of toothing 16 of the adjacent web 12. Thereby, the overlapping regions of the webs 12 engage over one another and are locked by the toothing 16. Due to the certain elasticity of the material of the webs the connection thereby effected is to a large extent densified against liquids.

The crossbars 20 or the crossbar portions 21 of the overlapping region 14 are gripping under the armature plates 2 and thereby are preventing a radial evading of the webs. Thus, a streamlined, cylindric body is formed.

What is claimed is:

1. An armature for a motor in a pump for liquids comprising, in combination:
   an armature shaft;
   a plurality of armature plates mounted on said shaft and having a plurality of radially extending winding slots therein, said plates being concentrically arranged about said shaft to provide a core having a plurality of longitudinally extending grooves formed by the walls of said slots;

an armature coil wound between said plates within said grooves and forming oppositely extending coil ends disposed about said shaft;

first and second symmetrical end covers respectively disposed on opposite ends of said shaft and enclosing said coil ends, each of said covers having a plurality of circumferentially spaced and longitudinally extending webs respectively received in said grooves, wherein the circumferential width of the radially outer portion of each of said webs is significantly less than the corresponding width of said groove and wherein said covers are circumferentially offset relative to one another so that said webs axially overlap one another in side by side nesting relationship therebetween; and, wherein each of said webs includes means for respectively interlocking said webs within said grooves.

2. The armature according to claim 1, wherein each of said webs includes a plurality of teeth generally extending toward the adjacent respective end of said shaft for engaging the corresponding plurality of teeth on the adjacent web in the respective one of said grooves.

3. The armature according to claim 2, wherein said end covers are of a resilient plastic material and wherein each cover is generally hemispherical and opening toward said armature plates.

4. The armature according to claim 3, wherein the radially inner portions of said grooves are wider than the radially outer portions thereof and wherein the radially inner portions of said webs are wider than the radially outer portions of said webs are wider than the radially outer portions thereof whereby said inner portions of said webs engage said inner portions of said grooves to prevent radially outward movement of said webs.

* * * * *